United States Patent
Dogan et al.

(10) Patent No.: US 10,815,424 B2
(45) Date of Patent: Oct. 27, 2020

(54) ONE-STEP PROCESS FOR SYNTHESIS OF CORE SHELL NANOCRYSTALS

(71) Applicants: KUANTAG NANOTEKNOLOJILER GELISTIRME VE URETIM A.S., Istanbul (TR); KOC UNIVERSITESI, Istanbul (TR)

(72) Inventors: Leyla Dogan, Istanbul (TR); Pinar Dagtepe, Istanbul (TR); Ibrahim Hocaoglu, Kocaeli (TR); Osman Vedat Akgun, Istanbul (TR); Havva Yagci Acar, Istanbul (TR)

(73) Assignees: KUANTAG NANOTEKNOLOJILER GELISTIRME VE URETIM A.S., Istanbul (TR); KOC UNIVERSITESI, Istanbul (TR)

( * ) Notice: Subject to any disclaimer, the term of this patent is extended or adjusted under 35 U.S.C. 154(b) by 683 days.

(21) Appl. No.: 15/393,235

(22) Filed: Dec. 28, 2016

(65) Prior Publication Data

US 2017/0190967 A1  Jul. 6, 2017

Related U.S. Application Data (60) Provisional application No. 62/273,457, filed on Dec. 31, 2015.

(51) Int. Cl.
*C09K 11/66* (2006.01)
*C09K 11/02* (2006.01)
(Continued)

(52) U.S. Cl.
CPC .......... *C09K 11/663* (2013.01); *C01G 11/02* (2013.01); *C01G 21/006* (2013.01);
(Continued)

(58) Field of Classification Search
CPC ... C09K 11/025; C09K 11/663; C09K 11/885; C01G 21/21; C01G 9/08; B22F 9/24; B82Y 40/00
(Continued)

(56) References Cited

U.S. PATENT DOCUMENTS

| 6,179,912 B1 | 1/2001 | Barbera-Guillem |
| 6,576,155 B1 | 6/2003 | Barbera-Guillem |

(Continued)

FOREIGN PATENT DOCUMENTS

| WO | 2004049522 A2 | 6/2004 |
| WO | 2006027778 A2 | 3/2006 |

(Continued)

OTHER PUBLICATIONS

Bharathi,R.N.;Sankar,S.,Mg Doping Effects on the Physical Properties of Lead Sulphide Thin Films,Int.J.ChemTech Res.,Feb. 6, 2015,vol. 7, No. 2,pp. 980-986.

(Continued)

*Primary Examiner* — Matthew E. Hoban
*Assistant Examiner* — Lynne Edmondson
(74) *Attorney, Agent, or Firm* — Halit N. Yakupoglu (57) ABSTRACT

Present invention provides a process for the synthesis of size and composition tunable colloidal PbMgS core and PbMgS/MS core shell quantum dots emitting in the near infrared (NIR) region of the spectrum in a single operation in a continuous flow reactor. M includes at least one of Cd, Mg, Zn and Cu metals.

22 Claims, 3 Drawing Sheets

(51) Int. Cl.
*C09K 11/00* (2006.01)
*C01G 21/21* (2006.01)
*C01G 9/08* (2006.01)
*C01G 21/00* (2006.01)
*C01G 11/02* (2006.01)
*B82Y 20/00* (2011.01)
*B82Y 40/00* (2011.01)

(52) U.S. Cl.
CPC .......... *C09K 11/025* (2013.01); *C09K 11/662* (2013.01); *B82Y 20/00* (2013.01); *B82Y 40/00* (2013.01); *C01P 2004/64* (2013.01); *C01P 2004/80* (2013.01); *Y10S 977/774* (2013.01); *Y10S 977/892* (2013.01); *Y10S 977/95* (2013.01)

(58) Field of Classification Search
USPC ..................................... 252/301.4 S, 301.6 R
See application file for complete search history.

(56) References Cited

U.S. PATENT DOCUMENTS

| | | |
|---|---|---|
| 6,682,596 B2 | 1/2004 | Zehnder et al. |
| 7,833,506 B2 | 11/2010 | Rauscher et al. |
| 8,354,090 B2 | 1/2013 | Han et al. |
| 8,540,939 B2 | 9/2013 | Niesz et al. |
| 2005/0129580 A1 | 6/2005 | Swinehart et al. |
| 2006/0068154 A1* | 3/2006 | Parce .................... B82Y 20/00 428/76 |
| 2008/0112856 A1 | 5/2008 | Stott et al. |
| 2010/0308271 A1 | 12/2010 | Bartel et al. |
| 2011/0042611 A1 | 2/2011 | Weller et al. |
| 2011/0048171 A1 | 3/2011 | Enright et al. |
| 2011/0104043 A1 | 5/2011 | Niesz et al. |
| 2011/0229397 A1* | 9/2011 | Bartel .................... B01J 19/243 423/299 |
| 2012/0001356 A1 | 1/2012 | Chang et al. |
| 2014/0026714 A1 | 1/2014 | Murphy et al. |
| 2014/0264171 A1 | 9/2014 | Schut et al. |

FOREIGN PATENT DOCUMENTS

| | | |
|---|---|---|
| WO | 2009132198 A2 | 10/2009 |
| WO | 2010010329 A2 | 1/2010 |
| WO | 2013079423 A1 | 6/2013 |
| WO | 2014124137 A1 | 8/2014 |
| WO | 2014153266 A2 | 9/2014 |
| WO | 2015138174 A1 | 9/2015 |

OTHER PUBLICATIONS

Pan et al.,Automated Synthesis of Photovoltaic-Quality Colloidal Quantum Dots Using Separate Nucleation and Growth Stages,ACS NANO,vol. 7,No. 11,Oct. 16, 2013,10158-10166.
PCT,International Search Report and Written Opinion of the International Searching Authority for International Application No. PCT/IB2016/001952,dated Jun. 1, 2017. 10 pages.
PCT,International Search Report and Written Opinion of the International Searching Authority for International Application No. PCT/IB2016/001953,dated Jun. 20, 2017. 16 pages.

* cited by examiner

ONE-STEP PROCESS FOR SYNTHESIS OF CORE SHELL NANOCRYSTALS

CROSS-REFERENCE TO RELATED APPLICATION

This patent application is related to and claims priority to U.S. Provisional Patent Application Ser. No. 62/273,457 entitled "One-Step Process for Synthesis of Core-Shell Nanocrystals" filed on Dec. 31, 2015, which is expressly incorporated by reference herein in its entirety.

BACKGROUND

Field of the Invention

The present invention relates to the field of nanotechnology and, more particularly, to the field of nanotechnology that includes core shell nanoparticles emitting light in near infrared region and their synthesis.

Description of the Related Art

Lead sulfide (PbS) quantum dot nanoparticles emitting in the near infrared region (NIR) are well-known nanomaterials. The optical and colloidal stability of such binary nanoparticles can be improved by growing inorganic shells on them and coating with different capping agents, i.e., surfactants, for colloidal stability as well as optical stability.

Optical stability is an important property for quantum dot nanoparticles. In this respect, PbS nanoparticles can be optically stable in their crude solutions or stay stable in different solvents at high concentrations. However, they can exhibit poor optical stability when used in solvents at low concentrations, especially for long term. The poor optical stability can be due to interactions between the solvent, the unpassivated cation or anions on the surface of PbS and capping agents on the PbS surfaces. This problem can originate from the disassociation of the capping agents from the surface, especially in the case of a highly interacting solvent, and also the lower affinity of the binding groups of the surfactants. In such cases, quantum dots can begin agglomerating and their optical properties can diminish partially or totally, and as a result their NIR emissions cannot be detected.

Metal sulfides (MS), such as CdS, ZnS and $Cu_2S$, have been known to provide optical stability when they are used as inorganic shell materials for passivating binary PbS nanoparticle surfaces. When optically stabilized, the PbS nanoparticles can give stable and recognizable emission yields for a long time. Surface passivation treatment prevents, so called, emission quenching effect, and thereby improving colloidal and optical stability of the PbS nanoparticle. Emission quenching affect changes and negatively affects the colloidal stability and optical stability of the PbS nanoparticle. The emission quenching effect can be related to the unwanted attachment of oxygen ions, other ions or ligands to the PbS surface defects such as uncoordinating cations or anions. The change in emission yields can be attributed to the tendency of electrons toward oxygen ions and also electron-hole pair distractions which can also adversely affect the emission properties of the PbS nanoparticles.

However, there are difficulties in forming protective MS shells on the surface of PbS cores because the PbS nanoparticles do not have the same zinc-blende crystal parameters as CdS, $Cu_2S$ or ZnS shell materials. The lattice mismatch between the PbS cores and the CdS, $Cu_2S$ or ZnS shell materials can create surface defects binding oxygen at the core shell interface. Such interface defects can also degrade the emission characteristics of PbS nanoparticles by way of emission quenching effect.

Recently, MgS shells have been introduced as an alternative shell material to challenge PbS surface oxidation problems because of its relatively higher binding affinity toward oxygen with respect to other shell materials, such as CdS, $Cu_2S$ and ZnS. However, although the smaller lattice mismatch between the PbS core and MgS shell makes MgS seemingly an attractive material for the purpose of passivating PbS nanoparticles, interface defect sites located between the PbS and MgS surfaces still present problems.

In order to address aforementioned problems with PbS quantum dot nanoparticles, there is a need for colloidally and optically stable alternative quantum dots structures and methods to manufacture such quantum dots.

SUMMARY

The present invention includes a method for manufacturing both colloidally and optically stable NIR emitting lead (Pb) based core shell nanoparticles or quantum dots by using a continuous flow reactor in a single operation.

The present invention includes the following core shell nanoparticle processes: (1) synthesis of size and composition tunable quantum dots having an emission rate of about NIR range; (2) synthesis of colloidally and optically stable quantum dots by including magnesium (Mg) material in the core structure; and (3) growth of an inorganic shell around the core nanoparticle in one step by a flow reactor without further purification steps. The present invention includes $Pb_xMg_{1-x}S$/ MS core shell quantum dots (QD), suitable for use in different solvents, comprising $Pb_xMg_{1-x}S$/ MS QD, wherein M is selected from Mg, Cd, Zn and Cu or a mixture thereof, and an organic coating including one or more capping agents or surfactants to stabilize said $Pb_xMg_{1-x}S$/ MS core shell QDs in a single step using a continuous flow reactor. The capping agents include molecules having binding or/and coating affinity for $Pb_xMg_{1-x}S$/ MS QDs surfaces.

An aspect of the present invention includes a composition, the composition including a nanostructure, and a surfactant bound to a surface of the nanostructure, the nanostructure including a core shell quantum dot with $Pb_xMg_{1-x}S$ core and a semiconductor shell comprising MS, where x value is between 0.7 and 0.95. M is selected from the group consisting of Cd, Mg, Zn and Cu and a combination thereof.

Another aspect of the present invention includes a method of forming core shell quantum dots, the method including forming a $Pb_xMg_{1-x}S$ core in a core solution in a first reactor, growing the $Pb_xMg_{1-x}S$ core nanocrystal in a second reactor in the core solution, blending the core solution including the $Pb_xMg_{1-x}S$ core nanocrystal with a shell solution to form a core shell solution in a third reactor, and growing an MS semiconductor shell on the surface of the a $Pb_xMg_{1-x}S$ core nanocrystal in the core shell solution in the third reactor to form a $Pb_xMg_{1-x}S$/MS core shell quantum dot, where x value is between 0.7 and 0.95, M being selected from the group consisting of Cd, Mg, Zn and Cu, and a combination thereof, and a surfactant included in at least one of the core solution and the shell solution being bound to the a surface of the $Pb_xMg_{1-x}S$/MS core shell quantum dot.

DETAILED DESCRIPTION

Before explaining the present method and system in detail, it is to be understood that the method and system are not limited to the particular embodiments and that they may be practiced or carried out in various ways.

The present invention relates to light emitting nanomaterials or nanostructures and processes for their synthesis. Specifically, it relates to quantum dot fluorescent nanomaterials. Further, the present invention relates to core shell structured fluorescent nanoparticles emitting light in the near infrared (NIR) region of the electro-magnetic spectrum (700-1700 nm wavelength range).

The meaning of the term "quantum dot" in this application may be interpreted broadly to include any semiconductive or metallic nanoparticle or nanocrystal that may be capable of emitting light under excitation. The size of the nanoparticle may be typically about 1 nm to about 100 nm, more typically between 2 nm and 10 nm.

In one embodiment, the present invention provides a process for the synthesis of optically stable core shell nanoparticles or core shell quantum dots including a lead (Pb) based chalcogenide core being coated with a metal chalcogenide shell. In one example, the present invention provides a $Pb_xMg_{1-x}S$/MS core shell nanoparticle including a $Pb_xMg_{1-x}S$ core nanoparticle coated with a metal sulphide (MS) layer, and an organic outer skin coating the shell. The x value in the $Pb_xMg_{1-x}S$ may be between about 0 and about 1, and M may be one of Cd, Mg, Zn and Cu metals, or any combination thereof. Another range for the x value may be between about 1 and about 0.6, thus, for this x value range, about 40% of Pb by mole may be replaced with Mg, resulting in about 60% Pb and about 40% Mg in moles in the PbMgS crystal. Other ranges for the x value may be between about 0.7 and about 0.95, and between about 0.75 and about 0.95. For clarity, the $Pb_xMg_{1-x}S$ core nanoparticle of the present invention will be referred to as PbMgS hereinafter.

PbMgS core of the PbMgS/MS core shell nanoparticles may differ from other conventional Pb based binary quantum dots (PbS, PbSe, etc.) by having Mg and PbS combined as a ternary alloy in the core nanoparticle. Alloying PbS with Mg metal may make the core crystal lattice structure stronger and reduce the interdiffusion of ions such as oxygen or other ions present in the environment. The added Mg metal may not only strengthen the core of the PbMgS/MS nanoparticle but also improves crystal surface while minimizing material defects. Surface reconstruction caused by adding Mg and the resulting compositional change may have large influence on the optical properties, and enhances the optical properties and other properties, such as optical and colloidal stability of the PbMgS/MS. Further, differing from the prior art's PbS/MS based core shell quantum dot nanoparticles, alloying the core with Mg may provide control over electronic and optical properties. Emission wavelengths of the PbMgS nanocrystal may be tuned in the NIR region by varying size and/or composition of the nanoparticle.

The present invention further provides a method for growing an MS inorganic shell material on the surface of PbMgS core to form a PbMgS/MS core shell nanocrystal. The MS shell may passivate the PbMgS core and minimize or eliminate prior art's defect related problems by reducing the surface defects at the core shell interface, thus enhancing the crystal structure of the core shell nanocrystal. Small lattice mismatch between the selected MS shell and the $Pb_xMg_{1-x}S$ core may advantageously help the shell substantially passivate the core surface, and hence reduce the surface defects. For example, the lattice mismatch between PbMgS core with unit cell parameter of less than 5.9362 Å and CdS shell with unit cell parameter of 5.8320Å may be about 1.76%; between PbMgS core and MgS shell with unit cell parameter of 5.62Å may be about 5.17%; and between PbMgS core and ZnS shell with unit cell parameter of 5.420Å may be about 8.70%. Good surface passivation is necessary in order for core nanocrystals (PbMgS) to prevent the intrinsic charge-carriers from interacting with the core nanocrystal surface.

As opposed to the prior art's multi step quantum dot manufacturing processes, the PbMgS/MS core shell quantum dots may be formed using a single step process in a continuous flow reactor, without any process interruptions or intervals. The synthesis process of the invention may allow scalable synthesis of the core shell nanoparticles for industrial production purposes. Other important benefits of the invention may be the control over an emission profile in the NIR (700-1700 nm) region by tuning both size and composition, an enhanced PLQY value (Photoluminescence Quantum Yield), and colloidal and optical stability of the nanoparticles even at very low concentrations in any organic media or solvent.

The reaction process conducted in the continuous flow reactor of the present invention may advantageously provide uniform control over the nucleation and growth process of quantum dot formation due to efficient and controlled heat and mass transfer throughout the reaction. The core shell quantum dot nanocrystal of the present invention exhibits improved optical stability and long term colloidal stability. The PbMgS core shell nanoparticles of the present invention may suspend in a solvent, for example in an oil base solvent without agglomeration while maintaining emission properties with respect to time.

Figure 1:
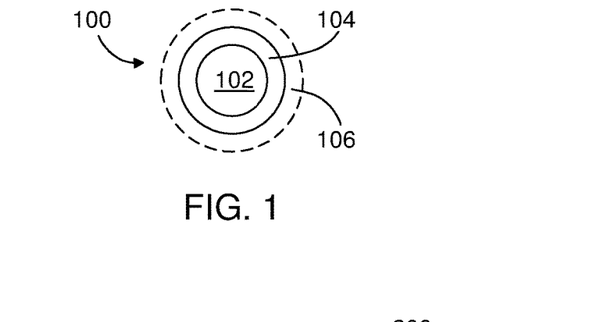
FIG. 1 is a schematic illustration of an exemplary core shell quantum dot nanoparticle formed using a flow process of the present invention.

Now turning to Figures, FIG. 1 schematically illustrates an exemplary core shell nanoparticle 100, or quantum dot, including a core 102, or core nanoparticle, a shell 104, or semiconductor shell, coating the core 102 and an outer skin 106, or organic coat, coating the shell 104. In one embodiment, the core 102 may be a Pb—Mg chalcogenide nanoparticle, such as PbMgS and the shell 104 may be a metal chalcogenide (inorganic material) coating, such as one of MgS, CdS, $Cu_2S$ and ZnS, and a combination thereof. In the embodiment the shell material may include semiconducting CdS or MgS materials, or CdZnS, CdMgS or ZnCuS materials. The shell 104 may have a substantially similar crystal structure, with minimal lattice mismatch, to the PbMgS core nanoparticle and substantially passivate the surface defects on the PbMgS core nanoparticle. Coating PbMgS inorganic core nanocrystal with the inorganic CdS or MgS shell materials may improve and enhance the crystal structure and optoelectronic properties of the PbMgS core nanocrystals.

The outer skin 106 may include at least one layer of mixed capping agents, or surfactants, to improve the surface quality of the core shell nanoparticle 100. The outer skin 106 may further enhance the quantum yield and the stability of the core shell nanoparticle 100 while allowing the core shell nanoparticle to homogeneously disperse in the medium such as an oil base solvent or oil, i.e., being soluble in an oil base solvent, that the core shell nanoparticles are introduced during applications. The surfactants may be oleic acid, organic acids including stearic acid, octanoic acid, lauric acid, thiolated hydrocarbons, alkylphosphonates, alkylphosphineoxides, acid functionalized polymers including, such as, poly(methacrylic acid) (PMAA), polymethylmethacrylate-co-methacrylic acid (PMMA-co-MA), polyethylene-co-methacrylic acid, and a combination thereof. Furthermore, the surfactants may include dodecanethiol, tri-n-octylphosphine (TOP), tri-n-octylphosphineoxide (TOPO), poly(methacrylic acid) (PMAA), polymethylmethacrylate-co-methacrylic acid (PMMA-co-MA), polyethylene-co-methacrylic acid, and a combination thereof.

Exemplary surfactants used as the outer skin material may include oleic acid, polymers with long chains containing —COOH functional groups, such as polyethylene-co-methacrylic acid, polyethylene-co-acrylic acid (PECA) (capability of multi-binding sides and of forming matrix), and their mixtures. Exemplary solvents may be organic solvents including aliphatic hydrocarbons, aromatic hydrocarbons, functionalized aliphatic hydrocarbons, functionalized aromatic hydrocarbons, alkanes, alkyl halides, alkenes, ketones, amines, amides, esters, ethers or a mixture thereof. Exemplary oil base solvents may be diesel, octadecene, toluene, hexane, trichloroethylene, tetrachloroethylene, engine oil, and the like.

The surfactant materials (capping agents) may also play an important role in the surface passivation of the core shell nanocrystal 100. The surfactant may be part of the precursor solution chemistry used during the synthesis to preserve the uniform size distribution of the nanocrystals and to prevent agglomeration of the nanocrystals. Furthermore, the surfactant material may be made selective to certain solvents and tailored to meet specific parameters such as solubility (in a medium, such as a solvent) and chemical reactivity. The surfactants themselves may also be used as a coordinating solvent. Type of a surfactant reveals main characteristic binding strength of the molecule which influences the growth dynamic of the nanocrystal. As will be explained below, oil soluble PbMgS/MS core shell nanocrystals can be water soluble by means of ligand exchange method.

Figure 2:
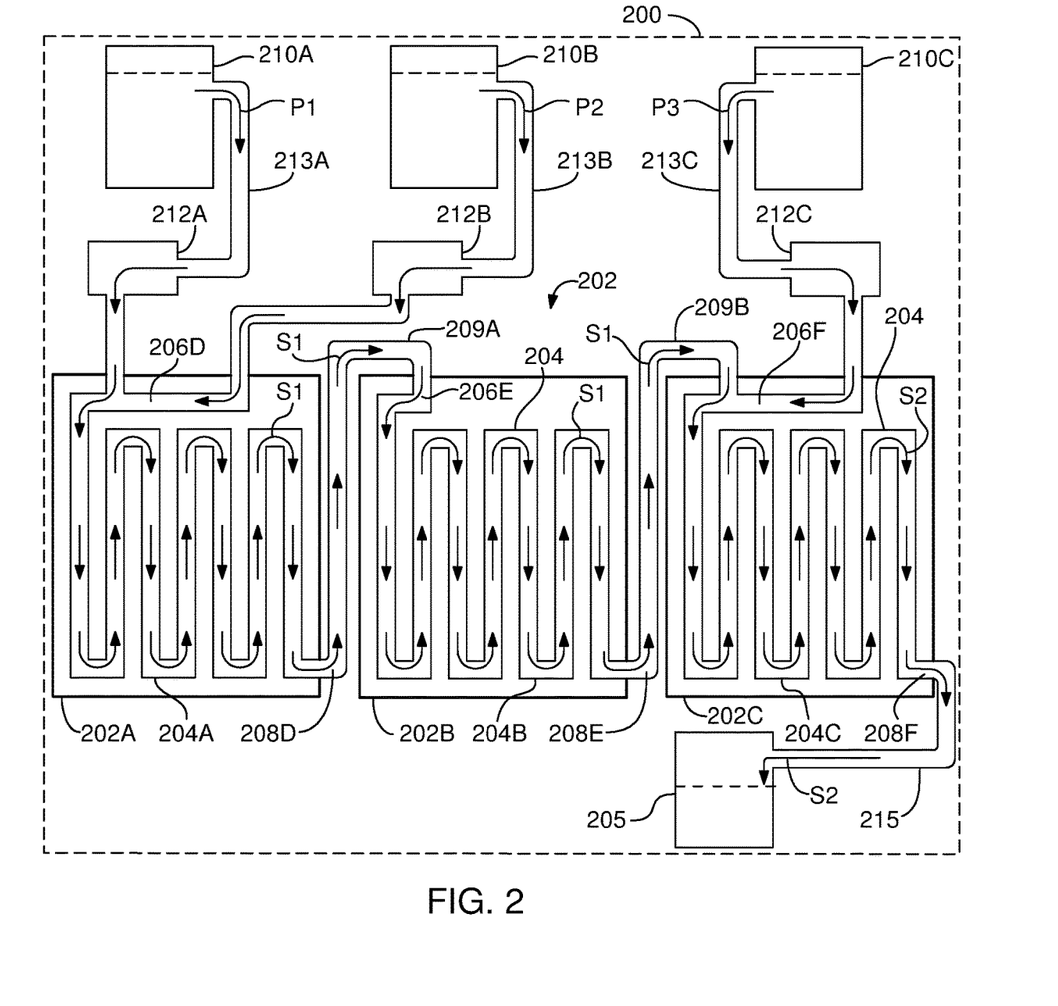
FIG. 2 is a schematic view of an embodiment of a continuous flow system of the present invention to produce core shell quantum dot nanoparticles of the present invention.

FIG. 2 shows a system 200 to implement a continuous flow process for synthesis of core shell nanoparticles, such as the core shell nanoparticle 100 shown in FIG. 1. In the system 200, PbMgS/MS core shell nanocrystals having a PLQY value higher than 40% and an emission range in the NIR region may be synthesized.

The system 200 includes a continuous flow reactor 202 including a first reactor 202A, a second reactor 202B and a third reactor 202C. A continuous process channel 204 of the continuous flow reactor 202 may extend continuously across the reactors 202A, 202B and 202C. Accordingly, the continuous process channel 204 may begin at an inlet 206D of the first reactor 202A, continue in the first reactor 202A as a first process channel 204A and leaves the first reactor 202A at an outlet 208D of the first reactor. A first conduit 209A may connect the outlet 208D of the first reactor 202A to an inlet 206E of the second reactor 202B, and the continuous reaction channel 204 may extend within the second reactor 202B as a second process channel 204B. The first conduit 209A establishes fluid communication between the first and second reactors 202A and 202B. A second conduit 209B may connect an outlet 208E of the second reactor 202B to an inlet 206F of the third reactor 202C, and the continuous reaction channel 204 may extend within the third reactor 202C towards an outlet 208F of the third reactor 202C. The second conduit 209B establishes fluid communication between the second and third reactors 202B and 202C.

Accordingly, a first supply conduit 213A may continuously connect the first precursor unit 210A via the pump 212A to the inlet 206D, and a second supply conduit 213B may continuously connect the second precursor unit 210B via the pump 212B to the inlet 206D of the first reactor 202A. A third supply conduit 213C may continuously connect the third precursor unit 210C via the third pump 212C to the inlet of the third reactor 206F. A product conduit 215 may also continuously connect the outlet 208F of the third reactor to a product storage tank 205.

Each of the precursor units 210A, 210B and 210C may include at least one batch reactor and supply tank to prepare and store precursor solutions including materials used during the core shell synthesis process. Accordingly, in the first precursor unit 210A, a first precursor solution P1 may be prepared. The first precursor solution P1 may include at least Pb and Mg source materials, capping agents and a solvent. In the second precursor unit 210B, a second precursor solution P2 may be prepared. The second precursor solution P2 may include a sulfur (S) source material and a solvent. In the third precursor unit 210C, a third precursor solution 210C may be prepared. The third precursor solution P3 may include a metal source, for example, a magnesium (Mg) or a cadmium (Cd) metal source material or combination thereof, capping agents and a solvent.

The first precursor solution P1, or the cation precursor, may be prepared in the first precursor unit 210A by mixing Pb and Mg salts (source materials) in non-coordinating solvents in the presence of mixed capping agents. The mixture may be vacuumed to remove dissolved $O_2$ and heated up to 80° C. under Ar gas atmosphere. In this process step, the Pb and Mg metal salts may be completely dissolved, which may be indicated by a color change in the solution from turbid yellow color to clear (pale yellow). The temperature of the solution may be raised to about 80-140° C. and heated for about 1 hour under Ar atmosphere. Next, the first precursor solution P1 may be cooled down to about 30-70° C.

The second precursor solution P2, or the anion precursor as a sulfur source, may be prepared in the second precursor unit 210B by dissolving, for example, bis(trimethylsilyl) sulfide in an Ar degassed organic solvent. The third precursor solution P3, or the shell cation precursor, including a metal (M) may be prepared in the third precursor unit 210C by mixing metal salts in non-coordinating solvents in the presence of mixed surfactants. The mixture is vacuumed to remove the dissolved $O_2$ and heated up to about 80-120° C. under Ar atmosphere. During the process, metal salts may be completely dissolved which may be indicated by the color change of the solution from turbid to clear. The temperature of the solution may be raised to about 140-250° C. and may be heated for 1 h under Ar atmosphere. Next, the third precursor solution P3 may be cooled to about 30-70° C. The reactors 202A-202C of the continuous flow reactor 202 may have heating, temperature and flow control systems and a computer control systems to control the whole flow process and reactions. The first, second and third reactors may be chip reactors.

Figure 3:
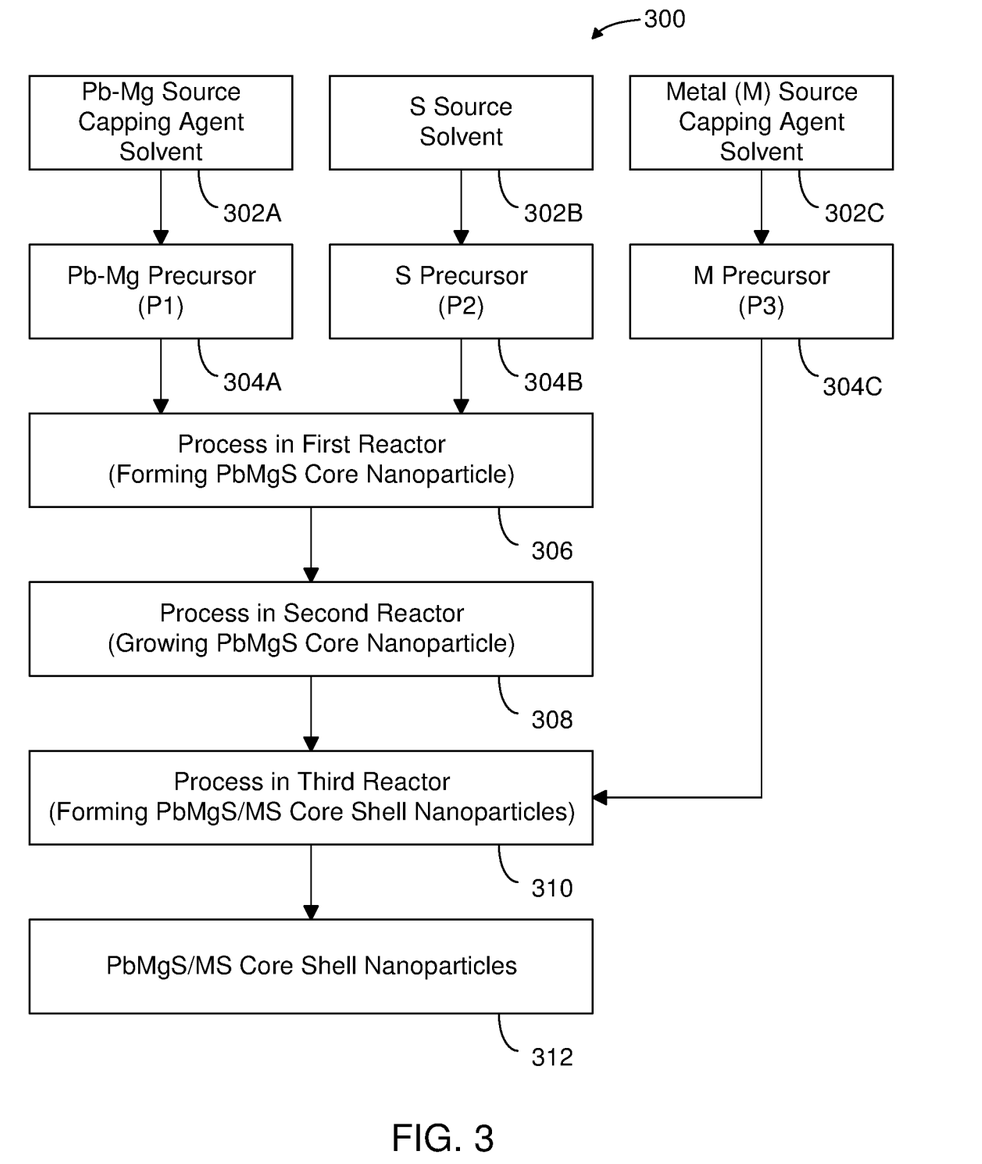
FIG. 3 is a flow diagram illustrating an exemplary process flow of an embodiment of the invention.

FIG. 3 is a process flow diagram 300 showing an embodiment of an exemplary process. Referring now to FIG. 2 and FIG. 3, in one embodiment, using the system 200 described above, PbMgS/MS core shell nanoparticles may be synthesized by cation exchange method in a single step with the exemplary process. The process of the present invention may initially begin with process stages 302A, 302B and 302C during which precursor preparation processes may be conducted at the precursor units 210A, 210B and 210C or the batch reactors to obtain: the first precursor solution P1, or a core cation precursor, including a complex of Pb—Mg with capping agents at process stage 304A; the second precursor solution P2, or an core anion precursor, including S-source material at process stage 304B; and, the third precursor solution P3, or a shell cation precursor including metal (M) complexes, for example a Mg or Cd complex or combination thereof, with capping agents at process stage 304C, to synthesis of PbMgS/ MS core shell quantum dot nanocrystals at process stage 310.

The process may continue with process stage 306 during which the PbMgS synthesis may be initiated in the continuous flow reactor 202 by mixing the first and second precursor solutions P1 and P2 to form the PbMgS nanocrystals. At this stage, the first and second precursor solutions P1 and P2 may be flowed through the pumps 212A and 212B at different flow rates and delivered to the inlet 206D of the first reactor 202A of the continuous flow reactor 202. As the precursor solutions P1 and P2 flow into the process channel 204A, they get mixed and form a first process solution S1. At process stage 306, PbMgS core nanocrystal nucleation may occur within the first reactor. The temperature of the first reactor 202A may be set to nucleation temperature of the PbMgS nuclei to form the PbMgS nanocrystals within the first process solution. The nucleation temperature may be in the range of 40-110° C. After a predetermined nucleation time such as 30-180 seconds depending on nucleation temperature and molar ratio of the reagents in the first reactor 202A, the first process solution S1 may exit the first reactor and delivered to the second reactor 202B of the continuous flow reactor 202.

At process stage 308, PbMgS core nanocrystal growth may occur within the second reactor. The first process solution S1 is flowed through the channel 204B of the second reactor 202B for suitable time while the growth temperature may be set to a lower temperature than that of the nucleation temperature. The PbMgS core nanocrystal growth temperature in the second reactor 202B may be in the range of about 30-100° C. PbMgS nanocrystal nucleation steps in the first reactor 202A and the growth step in the second reactor 202B may proceed upon residence time and flow rate. Total flow rate may be between about 1 ml/min and 9 ml/min depending upon the volumes of the reactors.

At process stage 310, to form the shell part of the core shell nanocrystals, the first process solution S1 including the PbMgS core nanocrystals from process stage 308 and the third precursor solution P3 including metal complexes from process stage 304C may be mixed by delivering them to the inlet 206F of the third reactor 202C. As the precursor solution P3 and the first process solution S1 flow into the process channel 204C, they get mixed and form a second process solution S2. The temperature of third reactor 202C may be adjusted between about 30 to 100° C. to obtain desired shell coating on the core nanoparticles, thereby forming the core shell PbMgS/MS nanoparticles at process stage 312. PbMgS/MS core shell nanoparticles may be obtained without any further purification of the PbMgS core obtained at the growth stage. Also using the third pump 212C, the flow rate of the third precursor P3 may be brought closer to the flow rate of the second process solution S2 and within predetermined residence time of the third reactor 202C, the shell coating may take place.

The core shell PbMgS/MS capped with the surfactants, i.e., capping agents may be flowed out of the outlet 208F of the third reactor 202C to the product storage tank 205 as final core shell product. The outer organic shell may be formed on the outer surface of the core nanoparticle by the capping agents within the precursor solutions, once the core nanoparticles form. Accordingly, although in this embodiment the synthesis or forming of the core-shell nanoparticles expressed in process stages 306-312 for clarity, the synthesis process may continuously take place within the continuous flow reactor 202 without any interruption, thus the synthesis process occurs in one step. Metal sulphide shell (MS) 104 may form in two ways during the one step process of the present invention, depending upon type of the metal.

Figure 4:
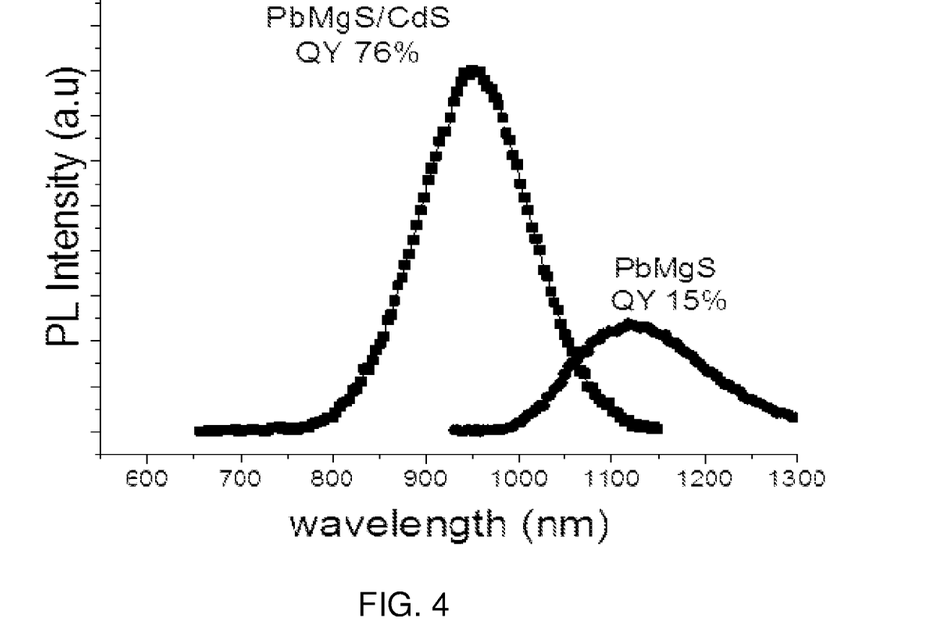
FIG. 4 is an exemplary graph depicting the effect of CdS shell on the quantum yield of PbMgS/CdS core shell nanoparticles.
Figure 5:
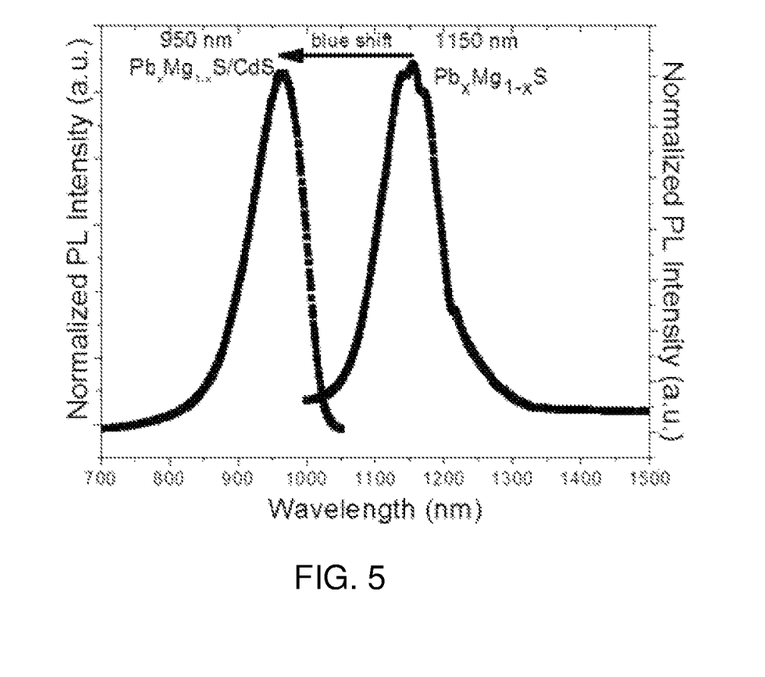
FIG. 5 is an exemplary graph depicting a PbMgS/CdS core shell nanoparticle photoluminescence emission, wherein the emission peak maximum has shifted toward blue in the NIR region of the electromagnetic spectrum as the CdS shell grows on the surface of PbMgS core.

In one embodiment, MS shell material formation may occur through cation exchange of metal with the Pb cations at the surface of the inorganic core nanocrystal. In a second embodiment, MS shell material formation may occur with direct reaction of metal precursor with the unreacted, excess, S ions coming from the reactor 202B. Size of the core particles 102 ranges from 2 to 6 nm. Thickness of shell 104 ranges from 1 to 2.5 nm. As shown in FIG. 4, the inorganic MS shell results in efficient radiative recombination of exciton in the core. The overcoating of PbMgS core with, for example, CdS shell may result in enhanced fluorescence quantum yield. MS shell growth process may be conducted by cation exchange process in which cations in the core are substituted for one or more cations. With the cation exchange process, the size of core PbMgS nanocrystal may decrease during the shell growth stage. Such reduction in core size may result in the blue shifting of photoluminescence maximum emission as the shell grows as exemplified in FIG. 5. The thickness of the MS shell is governed by the concentration of the third precursor P3 which is added for the cation exchange process, cation exchange temperature and growth time.

The surfactants are added to the mixed precursor (metal salts in solvent) solutions to preserve the uniform size distribution and to prevent agglomeration of the semiconductor nanocrystals, capping agents are generally exploited during the synthesis. The surfactants may include different groups with at least one functional group. Functional groups of the surfactants have ability to bind to the nanoparticle surface. The tail group (rest part of the capping agents) or the non-polar/polar side maintains the colloidal suspension in the desired solvent. The capping agents may selectively bind to the surface of the nanoparticles. During the growth stage, as the inorganic nanocrystals form and grow, surfactants/ capping agents moves to the active metal sides on the surface of the nanocrystals and form the outer shell 106. Thus capping agents are present only at the surface not in the nanocrystals.

Although the core shell nanocrystal manufacturing process of the present invention is carried in the flow reactor, alternatively synthesis may be carried out in a conventional batch system. In fact all the initial tests may be performed in batch reactors to optimize the reaction parameters that would be used in the flow reactor of the present invention. After setting the optimized reaction parameters, all the syntheses may be carried out in the flow reactor. Syntheses in the flow reactor system of the present invention may allow development of highly monodisperse and highly crystalline core and core shell nanoparticles (quantum dots) owing to controlled and efficient mass and heat transfer ability of the flow reactor system. It has been shown that there is a greater control over the heat transfer (flash heating), mass transfer and efficient mixing through the channels in the flow system. As a result, it is highly efficient to synthesize high quality quantum dots in the flow reactor 202.

In one embodiment, exemplary Pb and Mg sources may include lead (II) acetate ($Pb(OAc)_2$), lead II nitrate ($Pb(NO_3)_2$), lead (II) acetoacetonate, lead (II) oxide (PbO) or mixture of these lead salts with magnesium acetate ($Mg(OAc)_2$), magnesium chloride ($MgCl_2$), magnesium nitrate($Mg(NO_3)_2$) or magnesium oxide (MgO). Pb source can be one of lead II oxide (PbO), lead II acetate (Pb $(OAc)_2$), lead II nitrate ($Pb(NO_3)_2$). Mg source can be magnesium acetate ($Mg(OAc)_2$) and magnesium oxide (MgO).

In one embodiment, exemplary M source may include magnesium acetate (Mg(OAc)2), magnesium chloride ($MgCl_2$), magnesium nitrate($Mg(NO_3)_2$) or magnesium oxide (MgO); cadmium (II) acetate ($CdOAc)_2$), cadmium (II) chloride ($CdCl_2$), cadmium (II) nitrate($Cd(NO_3)_2$) or cadmium oxide (CdO); zinc (II) acetate ($ZnOAc)_2$), zinc (II) chloride ($ZnCl_2$), zinc (II) nitrate($Zn(NO_3)_2$) or zinc oxide (ZnO); copper (II) acetate($Cu(OAc)_2$), copper (I) chloride (CuCl), copper (II) chloride ($CuCl_2$), copper (II) nitrate(Cu $(NO_3)_2$), copper (II) sulfate($CuSO_4$), copper (II)oxide (CuO) or copper(I) oxide ($Cu_2O$). Mg source can be magnesium oxide (MgO) and magnesium acetate ($Mg(OAc)_2$). Cd source can be cadmium oxide (CdO) and cadmium (II) acetate ($CdOAc)_2$). Zn source can be zinc oxide (ZnO) and Zinc (II) acetate ($ZnOAc)_2$). Cu source can be copper (II) sulfate ($CuSO_4$). In one embodiment, exemplary S sources may include elemental sulfur, hydrogen sulfide ($H_2S$), thioacetamide (TAA) bis(trimethylsilyl)sulfide. A preferred S source may be bis(trimethylsilyl)sulfide.

Mixed surfactants as described in this invention may be any small molecule with an affinity to metal chalcogenide surface and strong binding activity, preferably, oleic acid, stearic acid, octanoic acid, lauric acid, oleylamine, dodecylamine, trioctylphosphine (TOP), trioctylphosphine oxide (TOPO), thiolated hydrocarbon, alkylphosphonates, alkylphosphineoxides, carboxyl, amine and thiolate functionalized polymers, polymethylmethacrylate-co-methacrylic acid (PMMA-co-MA), polyethylene-co-methacrylic acid and a mixture thereof. Preferred examples may be oleic acid (OA), polyethylene-co-methacrylic acid, polymethylmethacrylate-co-methacrylic acid (PMMA-co-MA), dodecanethiol (DDT), or combinations thereof. Exemplary non-coordinating organic solvents may be one of 1-octadecene (1-ODE), toluene, n-decane, long hydrocarbon chains and mixtures thereof.

EXAMPLE 1

Preparation of precursor I (Pb—Mg Precursor): A mixture of 20 mmol (4.464 g) of lead(II)oxide, 7 mmol (0.28 g) of magnesium(II)oxide, 57 mmol (18 ml) of oleic acid, 1.4 g of polyethylene-co-acrylic acid (PECA) and 135 ml of 1-octadecene was evacuated to get rid of dissolved oxygen and heated up to 80° C. under Ar atmosphere. Pb and Mg salts were completely dissolved which was indicated by the color change of the solution from turbid yellow to clear. The temperature of the solution was raised to 140° C. and was heated for about 1 h under Ar atmosphere. Then, the solution was cooled to 70° C.

EXAMPLE 2

Preparation of precursor II (S precursor): A mixture of 2.22 ml (10.6 mmol) of bis(trimethylsilyl)sulfide and 150 ml of 1-octadecene was stirred and degassed with Ar for 30 min.

EXAMPLE 3

Preparation of precursor III (Mg precursor): A mixture of 5 mmol (0.07 g) of magnesium(II)oxide and 10 mmol (3.2 ml) of oleic acid and 25 ml of 1-octadecene was evacuated to get rid of dissolved oxygen and heated up to 80° C. under Ar atmosphere. The temperature of the solution was raised to 120° C. and was heated for 1 h under Ar atmosphere to dissolve the entire metal source. Clear magnesium oleate solution was obtained. Then, the solution was cooled to 70° C. The solution was diluted to the certain volume (300 ml).

EXAMPLE 4

Preparation of PbMgS: Before the experiment start, the flow system was primed with 1-octadecene which was reaction solvent controlled by the software. All the reaction parameters were set by the software. The temperature of the first reactor 202A and second reactor 202B (FIG. 1) were set to 70° C. and 50° C. respectively. Total flow rate of precursors I and II was set to 2.25 ml/min. When the reactors reached their set temperature, the experiment started. Precursors I and Precursor II were mixed through the pumps and introduced into the first reactor 202A and continued to the second reactor 202B. Nucleation took place in the first reactor within 42 sec residence time. Growth step continued in the second reactor for 42 sec residence time.

EXAMPLE 5

Preparation of PbMgS/MgS: Before the experiment start, the flow system was primed with 1-octadecene which was reaction solvent controlled by the software. All the reaction parameters were set by the software. The temperature of the first reactor, second reactor and third reactors were set to 70° C., 50° C. and 70° C. respectively. Total flow rate of precursor I and II was set to 2.25 ml/min. Flow rate of precursor III was set to 2.25 ml/min. When the reactors reached their set temperature, the experiment started. Precursors I and Precursor II were mixed through the pumps and introduced into the first reactor 202A and continued to the second reactor 202B (FIG. 1). Nucleation of the core took place in the first reactor within 42 seconds. Growth of PbMgS core took place in the second reactor within 42 sec residence time. Then, PbMgS core was mixed with the precursor III at the third reactor 202C (FIG. 1). MgS shell formed in the reactor over the PbMgS core. Growth time was 21 sec at the temperature. Then the products (PbMgS/MgS) were collected into the collection tank 205 (FIG. 1).

EXAMPLE 6

Preparation of alternative precursor III (Cd precursor): A mixture of 10 mmol (0.13 g) of cadmium(II)oxide and 20 mmol (6.4 ml) of oleic acid and 20 ml of 1-octadecene was evacuated to get rid of dissolved oxygen and heated up to 80° C. under Ar atmosphere. The temperature of the solution was raised to 140° C. and was heated for 1 h under Ar atmosphere to dissolve the entire metal source. Clear cadmium oleate solution was obtained. Then, the solution was cooled to 70° C. The solution was diluted to the certain volume (300 ml).

EXAMPLE 7

Preparation of PbMgS/CdS: Before the experiment start, the flow system was primed with 1-octadecene which was reaction solvent controlled by the software. All the reaction parameters were set by the software. The temperature of the first reactor, second reactor and third reactors were set to 70° C., 50° C. and 70° C. respectively. Total flow rate of precursor I and II was set to 4.5 ml/min. Flow rate of precursor III was set to 4.5 ml/min. When the reactors reached their set temperature, the experiment started. Precursors I and Precursor II were mixed through the pumps and introduced into the first reactor 202A and continued to the second reactor 202B (FIG. 1). Nucleation of the core took place in the first reactor within 42 seconds. Growth of PbMgS core took place in the second reactor within 42 sec residence time. Then, PbMgS core was mixed with the precursor III at the third reactor 202C (FIG. 1). CdS shell formed in the reactor over the PbMgS core. Growth time was 21 sec at the temperature. Then the products (PbMgS/CdS) were collected into the collection tank 205 (FIG. 1).

Organic capped PbMgS/MS core shell nanocrsytals may be used in fiber optic communication systems, used for photovoltaic cells, used in NIR detectors-cameras, used as identification purpose in different organic media. Also by means of ligand exchange method, the organic shell (hyrophobic) material may be replaced with water soluble ligands including, thiolate alkyl acids (L-cystine, thioglycolic acid, mercaptoacetic acid, mercaptopropionic acid, glutathione, thioglycerol, and derivatives of them). Ligand exchanged PbMgS/MS quantum dot nanocrystals may be used as fluorescent tags for biological applications including in vitro and in vivo cell and tissue imaging, tagging, tracking, biolabeling and other theranostics related.

Although aspects and advantages of the present invention are described herein with respect to certain preferred embodiments, modifications of the preferred embodiments will be apparent to those skilled in the art. Thus the scope of the present invention should not be limited to the foregoing discussion, but should be defined by the appended claims.

We claim:

1. A composition, comprising:
   a nanostructure; and
   a surfactant bound to a surface of the nanostructure, the surfactant including an oil-dispersible polymer containing a functional group, wherein the oil-dispersible polymer includes polyethylene-co-acrylic acid (PECA),
   wherein the nanostructure includes a core shell quantum dot with $Pb_xMg_{1-x}S$ core and a semiconductor shell comprising MS, M being metal and selected from the group consisting of Mg, Cd, Zn and Cu and a combination thereof, where x value is between 0.7 and 0.95.

2. The composition of claim 1, wherein x value is between 0.75 and 0.95.

3. The composition of claim 1, wherein MS includes one of CdZnS and CdMgS.

4. The composition of claim 1, wherein the core quantum dot photoluminesces with a quantum efficiency of about 10%-50%.

5. The composition of claim 1, wherein the core shell quantum dot photoluminesces with a quantum efficiency of at least about 40%-80%.

6. The composition of claim 1, wherein the composition is dispersible in an oil-based solvent.

7. The composition of claim 6, wherein the surfactant is a solvent selective surfactant enabling the core shell quantum dot to homogeneously disperse within the oil-based solvent.

8. The composition of claim 7, wherein the surfactant includes oleic acid.

9. The composition of claim 7, wherein the surfactant includes at least one of oleic acid, dodecanethiol, trioctylphospine, and trioctylphosphineoxide.

10. The composition of claim 1, wherein the quantum dot fluoresces with an emission maximum in the range of 700-1400 nm.

11. The composition of claim 6, wherein the oil-based solvent includes gasoline, diesel, octadecene, toluene, hexane, trichloroethylene, tetrachloroethylene, engine oil.

12. A composition, comprising:
    a nanostructure; and
    a surfactant bound to a surface of the nanostructure, the surfactant including an oil-dispersible polymer containing a functional group, wherein the oil-dispersible polymer includes polyethylene-co-methacrylic acid,
    wherein the nanostructure includes a core shell quantum dot with $Pb_xMg_{1-x}S$ core and a semiconductor shell comprising MS, M being metal and selected from the group consisting of Mg, Cd, Zn and Cu and a combination thereof, where x value is between 0.7 and 0.95.

13. The composition of claim 12, wherein x value is between 0.75 and 0.95.

14. The composition of claim 12, wherein MS includes one of CdZnS and CdMgS.

15. The composition of claim 12, wherein the core quantum dot photoluminesces with a quantum efficiency of about 10%-50%.

16. The composition of claim 12, wherein the core shell quantum dot photoluminesces with a quantum efficiency of at least about 40%-80%.

17. The composition of claim 12, wherein the composition is dispersible in an oil-based solvent.

18. The composition of claim 17, wherein the surfactant is a solvent selective surfactant enabling the core shell quantum dot to homogeneously disperse within the oil-based solvent.

19. The composition of claim 18, wherein the surfactant includes oleic acid.

20. The composition of claim 18, wherein the surfactant includes at least one of oleic acid, dodecanethiol, trioctylphospine, and trioctylphosphineoxide.

21. The composition of claim 12, wherein the quantum dot fluoresces with an emission maximum in the range of 700-1400 nm.

22. The composition of claim 17, wherein the oil-based solvent includes gasoline, diesel, octadecene, toluene, hexane, trichloroethylene, tetrachloroethylene, engine oil.

* * * * *